Richard Emerson,
Harvester Rake.
No. 119,130.          Patented Sep. 19, 1871.
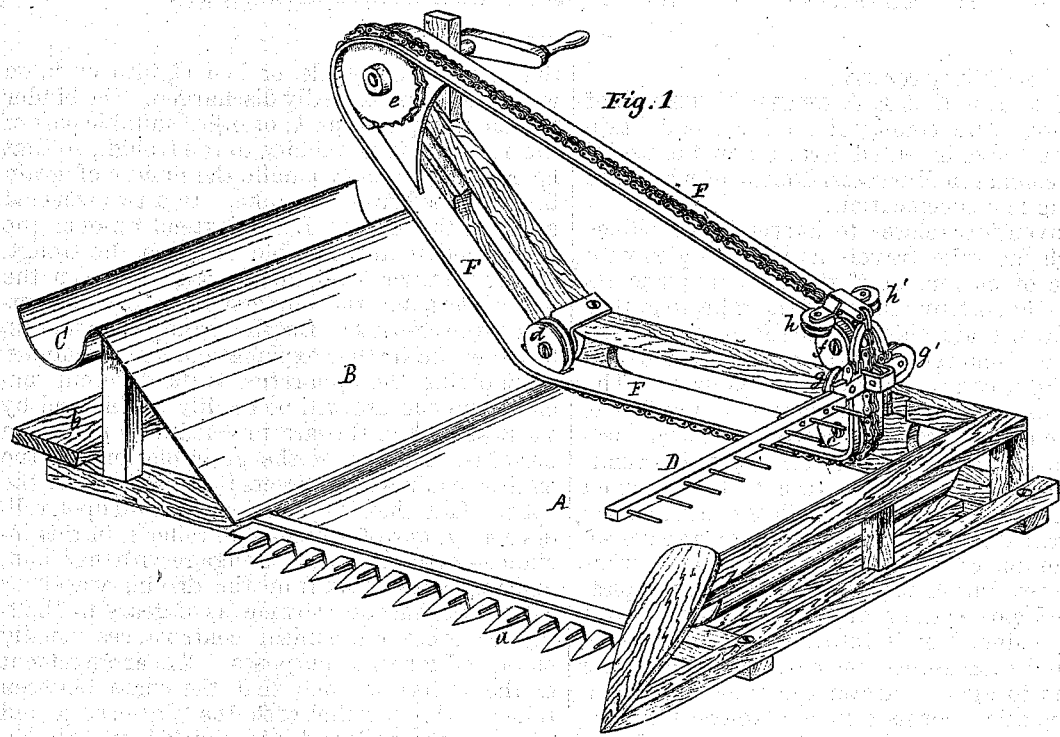
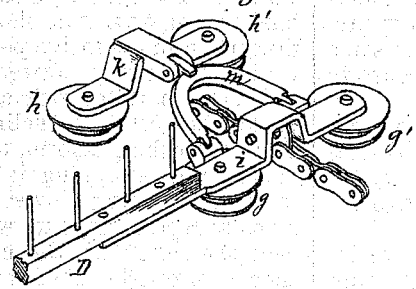

UNITED STATES PATENT OFFICE.

RICHARD EMERSON, OF SYCAMORE, ILLINOIS.

IMPROVEMENT IN HARVESTER-RAKES.

Specification forming part of Letters Patent No. 119,130, dated September 19, 1871.

*To all whom it may concern:*

Be it known that I, RICHARD EMERSON, of Sycamore, in the county of De Kalb and State of Illinois, have invented certain new and useful Improvements in Harvester-Rakes, of which the following is a specification:

My invention relates to harvesting-machines in which the rake travels at right angles with the line of movement of the machine; and its object is, at each revolution of the rake, to gather a bundle of grain, elevate it to the proper height, and then discharge it into the trough or receptacle where it can be handled by the binder. The apparatus to which my invention is applied is composed of a grain or cutting-platform, provided at the inner side with an incline terminating in a trough or grain-receptacle, combined with a rake actuated by an endless chain to move in a vertical plane at right angles or transversely to the line of motion of the machine, so that at each revolution it will sweep across the platform and gather the grain, then carry the same up the incline, drop it into the trough or receptacle, and then return to the outer side of the platform to again perform the same operation. The invention consists in a rake-truck or carriage for supporting the rake, and a guide-frame for supporting and directing the movement of the carriage, in combination with the endless chain, grain-platform, incline, and grain-receptacle, as hereinafter described, the truck being fastened to and actuated by the chain.

To enable others skilled in the art to understand and use my invention, I will now proceed to describe the manner in which the same is or may be carried into effect by reference to the accompanying drawing, in which—

Figure 1 is a perspective view of a harvester-rake and grain-platform arranged in accordance with my invention. Fig. 2 is a view on an enlarged scale of the rake-truck or carriage detached.

A represents the grain-platform of a harvester of any ordinary or suitable construction. On front of the platform the finger-bar $a$ is arranged in the usual manner. At the inner side of the platform, or that side next the machine, is an incline, B, the base of which meets the platform A at or near the line where the finger-bar terminates. It thence extends diagonally upward to a suitable height, as shown in Fig. 1, and then meets the trough, receptacle, or bed C, into or upon which the grain is finally discharged. The binder stands on a platform, $b$, or other suitable part of the machine in proximity to the trough, so that he can conveniently handle the bundle of grain thus dropped from the rake. In a two-wheeled machine the incline B can extend up over the near wheel to any suitable distance, the trough can be arranged over the carriage between the two wheels, and the binder's stand can be outside of the off-wheel. But this arrangement needs, however, no further explanation, as the manner of applying the apparatus to the different machines now in use will be readily understood by those skilled in the art to which this invention pertains. In rear of the grain-platform is the endless chain which directs the movement of the rake. This chain is mounted and held upon rollers $c\ d\ e\ f$, one of which—the roller $e$, in this instance—is toothed so as to engage with the chain, and receives motion from the driving-wheels or axle of the harvester by means of gears and belting or other mechanical contrivances usually employed for such purposes. The arrangement of the rollers is such that the chain between rollers $c\ d$ is parallel with the platform A and between the rollers $d\ e$ is parallel with the incline B. The chain passes back over the roller $e$ to roller $f$, and thence to the first roller $c$. The roller $e$ is placed far enough over and beyond the incline B to cause the rake to sweep up beyond the incline so as to discharge the grain into the trough. The rake D is secured to the chain, extending out from it as shown in the drawing, so that when in operative position—that is to say, while it is moving between the rollers $c\ d\ e$—it will move parallel with and in close proximity to the platform and incline, first gathering the grain from the platform, then carrying it up the incline, then dropping it into the trough, after which it is carried over the rollers $e\ f$ and returns to recommence its work. In order to connect the rake with the chain and at the same time to properly brace, uphold, and guide it, I employ a carriage or truck composed of the two pairs of wheels $g'\ g'\ h\ h'$, the rake being fixed to a lateral extension of the bar $i$, to which the front wheels are pivoted. This bar $i$ is attached to the chain and is connected with the bar $k$, which carries the rear wheels $h\ h'$ by means of a frame or connecting-yoke, $m$, jointed to both bars $i\ k$, so that each pair of wheels may have perfect freedom of motion in turning the corners of the guide-frame upon which it is designed to run. The wheels are arranged upon vertical axes, in contradistinction to the horizontal axes upon which wheels of trucks usually run, and they are intended to embrace and clasp between them the edges of a guide-frame, F, which is arranged in contact with or so as to follow the path of the endless chain and within the space inclosed by the same. The wheels are consequently grooved on their peripheries, and are so placed upon the guide-frame that the edges of the frame will fit in the grooves. The rake-truck is thus held and firmly braced and supported in place at the same time that it follows every movement of the chain.

The truck, when constructed as described, is capable of turning the corners of the guide-frame with the greatest ease, and the guide-frame serves in a measure to uphold the chain and to give strength and stability to the apparatus.

Having now described my invention, and the manner in which the same is or may be carried into effect, what I claim, and desire to secure by Letters Patent, is—

The guide-frame, rake, and rake-truck or carriage, substantially as described, in combination with the endless chain, grain-platform, incline, and grain-trough or receptacle, as shown and set forth.

In testimony whereof I have signed my name to this specification before two subscribing witnesses.

RICHARD EMERSON.

Witnesses:
MORRIS HOLCOMB,
A. J. CLARK.                                (47.)